United States Patent
Sato

(10) Patent No.: US 7,178,221 B2
(45) Date of Patent: Feb. 20, 2007

(54) METHOD OF FORMING A THIN FILM MAGNETIC HEAD

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 201 days.

(21) Appl. No.: 10/949,966

(22) Filed: Sep. 23, 2004

(65) Prior Publication Data

US 2005/0036242 A1 Feb. 17, 2005

Related U.S. Application Data

(62) Division of application No. 10/414,843, filed on Apr. 15, 2003, now Pat. No. 6,967,055.

(30) Foreign Application Priority Data

Apr. 19, 2002 (JP) ............................. 2002-118078

(51) Int. Cl.
  *H04R 31/00* (2006.01)
  *G11B 5/33* (2006.01)
(52) U.S. Cl. .............. 29/603.07; 29/603.12; 29/603.14; 29/603.16; 29/603.18; 360/313
(58) Field of Classification Search ............ 29/603.07, 29/603.12, 603.16, 603.18, 603.14, 603.08; 360/313, 319, 322; 428/172, 813, 824; 451/57, 451/58

See application file for complete search history.

(56) References Cited

U.S. PATENT DOCUMENTS

| | | | |
|---|---|---|---|
| 5,597,341 A | 1/1997 | Kodera et al. | |
| 5,633,771 A | 5/1997 | Yoda et al. | |
| 5,920,762 A | 7/1999 | Simmons et al. | |
| 5,946,167 A * | 8/1999 | Hara et al. ................. | 360/322 |
| 6,056,996 A | 5/2000 | Yoda et al. | |
| 6,088,195 A * | 7/2000 | Kamiguchi et al. ..... | 360/324.12 |
| 6,207,466 B1 | 3/2001 | Kamijima | |
| 6,266,868 B1 | 7/2001 | Sasaki | |
| 6,278,580 B1 * | 8/2001 | Sasaki ......................... | 360/126 |
| 6,340,558 B1 * | 1/2002 | Kubota et al. .............. | 430/320 |
| 6,407,004 B1 | 6/2002 | Kimura et al. | |
| 6,943,041 B2 | 9/2005 | Sugita et al. | |
| 2003/0162344 A1 | 8/2003 | Ishii et al. | |
| 2004/0127041 A1 | 7/2004 | Kamijima | |

FOREIGN PATENT DOCUMENTS

| | | |
|---|---|---|
| EP | 0 617 409 | 12/1996 |
| JP | 07-044822 | 2/1995 |
| JP | 8-102016 | 4/1996 |
| JP | 10-228-611 | 8/1998 |
| JP | 10/228611 | 8/1998 |
| JP | 2002-92821 | 3/2002 |
| WO | WO 00/33358 | 6/2000 |

* cited by examiner

*Primary Examiner*—A. Dexter Tugbang
*Assistant Examiner*—Tai Van Nguyen
(74) *Attorney, Agent, or Firm*—Brinks Hofer Gilson & Lione

(57) ABSTRACT

In a thin-film magnetic head having a multilayered film developing a magnetoresistive effect, which is present between an upper shielding layer and a lower shielding layer both formed above an AlTiC substrate, a recess for defining the lower shielding layer is formed in an underlayer present on a surface of the AlTiC substrate, and a lower shielding layer made of NiFe is provided in the recess. A SiO$_2$ film is interposed between the underlayer and the lower shielding layer.

3 Claims, 3 Drawing Sheets

METHOD OF FORMING A THIN FILM MAGNETIC HEAD

This application is a divisional application of U.S. application Ser. No. 10/414,843 filed on Apr. 15, 2003, now U.S. Pat. No. 6,967,055 entitled "THIN-FILM MAGNETIC HEAD AND METHOD OF FORMING THE SAME."

BACKGROUND OF THE INVENTION

1. Field of the Invention

The present invention relates to a thin-film magnetic head (magnetoresistive head) for reading (and writing) information with high-density recording by utilizing the magnetoresistive effect, and a method of forming the thin-film magnetic head.

2. Description of the Related Art

A thin-film magnetic head for reproduction includes, in its basic structure, a multilayered film developing the magnetoresistive effect between an upper shielding layer and a lower shielding layer, which are formed above an AlTiC substrate. A thin-film magnetic head is also known which is constituted as a recording/reproducing head by forming, on the thin-film magnetic head for reproduction, a thin-film inductive head for recording (magnetoresistive recording head). Roughly speaking, the thin-film magnetic head for recording and reproduction is constructed by successively forming a lower shielding layer, a lower gap layer, a magnetoresistive sensor, an upper gap layer, an upper shielding layer, and a lower core layer (in the case of a piggyback type structure) (or, as an alternative, a merged type structure is obtained in which the upper shielding layer serves also as the lower core layer), and then by successively forming, on the lower core layer, a magnetic pole section and a coil layer both positioned to locate in an Air Bearing Surface (ABS), a gap layer, an upper core layer, and a barrier layer.

In the process of manufacturing such a thin-film magnetic head for reproduction and a thin-film magnetic head for recording and reproduction, a magnetic film serving as the lower shielding layer has been formed over an entire substrate surface in the past. However, it is a recent prevailing tendency to reduce an area in which the lower shielding layer is formed (i.e., to form a partial lower shielding layer) for the purpose of either reducing the probability of a short-circuit with a wiring pattern of a multilayered film or improving the reproduction performance.

Hitherto, such a partial lower shielding layer has been formed through the following steps. On an AlTiC substrate having a substrate protective layer made of alumina ($Al_2O_3$), a resist is formed by photolithography to define an area in which the lower shielding layer is to be formed. Then, a soft magnetic material constituting the lower shielding layer, such as Permalloy (NiFe), is plated (by frame plating) over the entire substrate surface under a magnetic field. After removing useless layers including the resist, an alumina film is formed over the entire substrate surface including the lower shielding layer. Then, the alumina is scrapped off by a Chemical Mechanical Polishing (CMP) step until the lower shielding layer is exposed.

The above-described conventional method of forming the partial lower shielding layer, however, essentially requires expensive equipment and an additional step for forming an alumina film. Also, a strong-acid slurry is usually employed in the polishing CMP step of scraping off the alumina film until the lower shielding layer is exposed. However, because polishing rates of alumina and a soft magnetic material, such as Permalloy, are substantially equal to each other, it is typically difficult to control the film thickness of the lower shielding layer (i.e., deciding when to end the CMP step). Further, the alumina surface is typically corroded and roughed with the use of a strong-acid slurry. In addition, in a photolithography step of forming a resist layer to define a track width of a magnetoresistive sensor, a film thickness distribution of the resist layer is not uniform and a variation may occur in the track width of the magnetoresistive sensor.

SUMMARY OF THE INVENTION

Taking into account the above-mentioned problems with the conventional process of forming a partial lower shielding layer, it is an object of the present invention to provide a thin-film magnetic head and a method of forming the thin-film magnetic head, which can easily control a film thickness of the lower shielding layer with no need for additional formation on an alumina film. Also, it is an object of the present invention to provide a thin-film magnetic head and a method of forming the thin-film magnetic head, which can define a track width of a magnetoresistive sensor with high accuracy, the sensor being formed after forming the lower shielding layer, and which is adaptable for a tendency toward a narrower track.

An AlTiC substrate generally requires, as a substrate protective layer, an underlayer made of alumina. The underlayer prevents an electrical short-circuit possibly occurring between the conductive AlTiC substrate and external devices. In view of the presence of such an underlayer, the present invention has been accomplished based on the finding that equipment for forming an alumina film and an additional step of forming the alumina film are no longer required by utilizing the underlayer to define an area, in which the partial lower shielding layer is to be formed. More specifically, the present invention provides a thin-film magnetic head wherein a multilayered film developing a magnetoresistive effect is present between an upper shielding layer and a lower shielding layer both formed above an AlTiC substrate, a recess for defining the lower shielding layer is formed in an underlayer present on a surface of the AlTiC substrate, and a lower shielding layer made of a soft magnetic material is provided in the recess.

In the present invention, to facilitate the control of a film thickness of the lower shielding layer, a $SiO_2$ film can be interposed between the underlayer and the lower shielding layer. By employing the $SiO_2$ film as a stopper in the CMP step of polishing the lower shielding layer, the duration of the polishing step can be easily determined because the $SiO_2$ film has a lower polishing rate than alumina. Also, because the $SiO_2$ film has a higher dielectric voltage withstand than alumina, the presence of the $SiO_2$ film provides another advantage in that the insulation (voltage withstand) between the lower shielding layer and the AlTiC substrate can be improved. Further, because the $SiO_2$ film has a higher corrosion resistance to a strong-acid slurry than alumina, the polished surface can be kept flat. Accordingly after the polishing step, in a step of forming a resist layer to define a track width of a magnetoresistive sensor, a film thickness distribution of the resist layer can be made uniform and the track width of the magnetoresistive sensor can be defined with high accuracy. Consequently, a thin-film magnetic head can be obtained which is suitable for a higher recording density engendered from a tendency toward narrower tracks.

According to another aspect, the present invention provides a method of forming a thin-film magnetic head, the method comprising the steps of preparing an AlTiC substrate having an underlayer and forming, in the underlayer, a lower-shielding formed recess corresponding to an area in which a lower shielding layer is to be formed; forming a $SiO_2$ film on a substrate surface including the lower-shielding formed recess; forming a lower shielding layer made of a soft magnetic material on the $SiO_2$ film; and polishing the lower shielding layer with the $SiO_2$ film serving as a stopper until the $SiO_2$ film is exposed. With this forming method, the $SiO_2$ film is formed to interpose between the underlayer and the lower shielding layer. After the step of polishing the lower shielding layer, a step of removing the $SiO_2$ film other than the $SiO_2$ film in the lower-shielding formed recess may be performed so that an upper surface of the lower shielding layer and an upper surface of the underlayer define the same plane (flat plane).

According to still another aspect, the present invention provides a method of forming a thin-film magnetic head, the method comprising the steps of preparing an AlTiC substrate having an underlayer and forming a $SiO_2$ film on the underlayer; forming, through the $SiO_2$ film and partly in the underlayer, a lower-shielding formed recess corresponding to an are-a in which a lower shielding layer is to be formed; forming a lower shielding layer made of a soft magnetic material on a substrate surface including the lower-shielding formed recess; and polishing the lower shielding layer with the $SiO_2$ film serving as a stopper until the $SiO_2$ film is exposed. With this forming method, since the $SiO_2$ film present in the area in which the lower shielding layer is to be formed is removed, the lower shielding layer is directly formed on the underlayer in the lower-shielding formed recess. After the step of polishing the lower shielding layer, a step of removing the $SiO_2$ film may be performed so that the upper surface of the lower shielding layer and the upper surface of the underlayer constitutes the same plane.

The lower-shielding formed recess is preferably formed by ion milling, or the like, so that the shape and the depth of the lower-shielding formed recess can be appropriately controlled.

In the above-described thin-film magnetic head and method of forming the thin-film magnetic head, the underlayer present on the AlTiC substrate is generally formed of alumina. Also, NiFe can be employed as the soft magnetic material forming the lower shielding layer.

DESCRIPTION OF THE PREFERRED EMBODIMENTS

Figure 1:
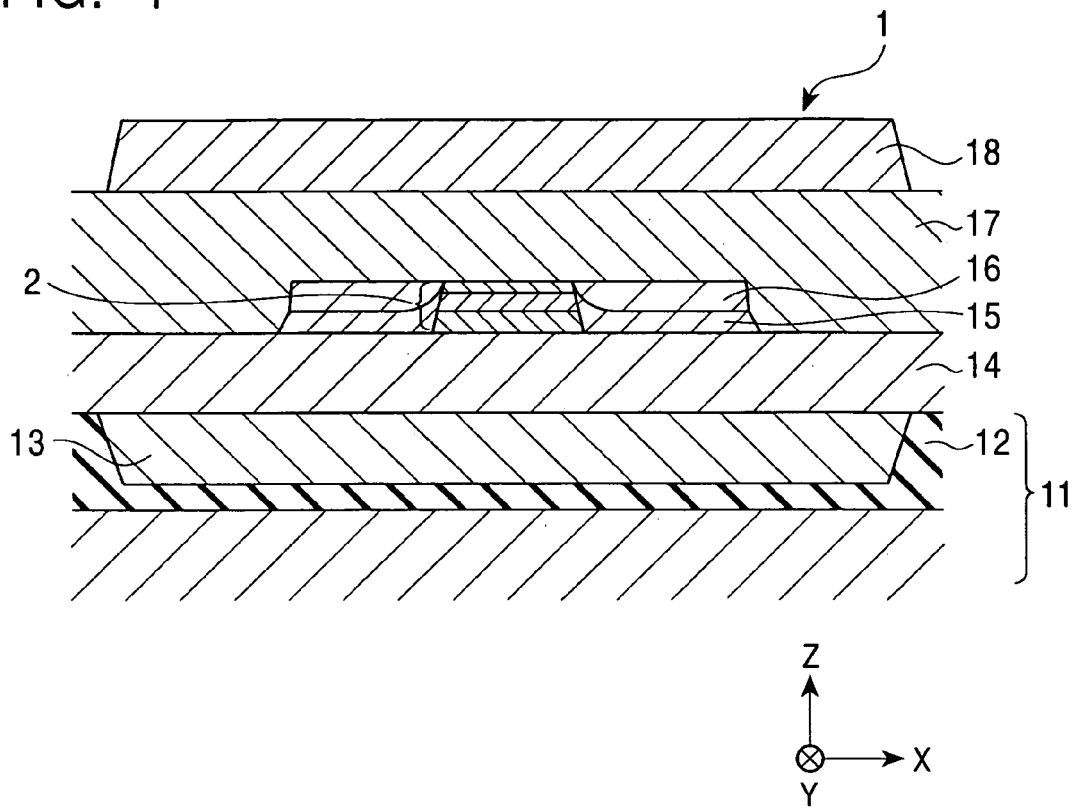
FIG. 1 is a sectional view, as viewed from the side of a head surface (ABS surface) positioned to face a recording medium, showing an overall multilayered structure of a thin-film magnetic head according to a first embodiment of the present invention.

FIG. 1 is a sectional view, as viewed from the side of a head surface (ABS surface) positioned to face a recording medium, showing an overall multilayered structure of a thin-film magnetic head 1 according to a first embodiment of the present invention. The thin-film magnetic head 1 is a thin-film magnetic head for reproduction, which is provided at a trailing-side end of a floating slider of a hard disk drive, for example. In FIG. 1, X-, Y- and Z-directions are defined respectively as a direction of a track width, a direction of a magnetic field leaked from the recording medium, and a moving direction of the recording medium.

The thin-film magnetic head 1 has a substrate (AlTiC substrate) 11 made of aluminum-titanium-carbide (AlTiC). On a surface of the AlTiC substrate 11, an underlayer 12 made of alumina is formed as a substrate protective layer in advance.

On the AlTiC substrate 11, a lower shielding layer 13, a lower gap layer 14, a magnetoresistive sensor 2, an upper gap layer 17, and an upper shielding layer 18 are successively formed in this order from the substrate side. The lower shielding layer 13 and the upper shielding layer 18 are each formed of a soft magnetic material. The lower gap layer 14 and the upper gap layer 17 are each formed of a nonmagnetic material. The magnetoresistive sensor 2 is constituted as a multilayered film formed as a substantially trapezoidal section and developing the magnetoresistive effect. The magnetoresistive sensor 2 can be practiced as any Giaht Magnetoresistive (GMR) sensors, an Anisotropic Magnetoresistive (AMR) sensor and so on.

On each of both sides of the magnetoresistive sensor 2 in the direction of the track width, a bias layer 15 made of a highly magnetic material, such as a CoPt alloy, and an electrode layer 16 made of an electrically conductive material, such as Au, are successively formed in this order from the side of the lower gap layer 14. The upper gap layer 17 and the upper shielding layer 18 are positioned on the electrode layers 16. Though not shown, a bias buffer layer made of a metal film, such as Cr or Ta, is formed between the lower gap layer 14 and the bias layer 15.

Figure 2:
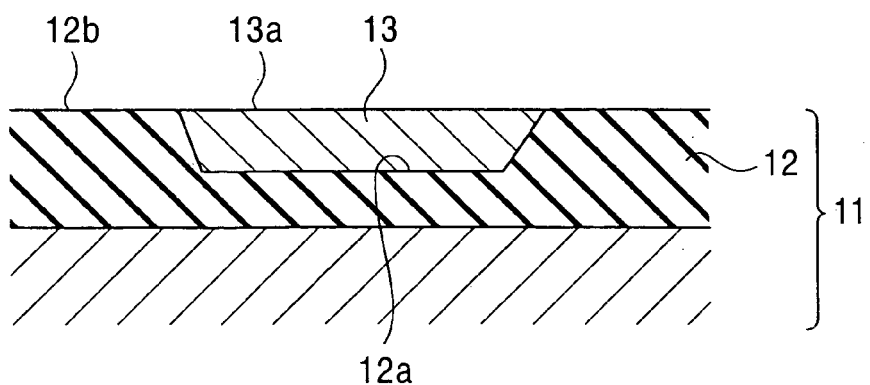
FIG. 2 is an enlarged partial sectional view of a multilayered structure around a lower shielding layer of the thin-film magnetic head shown in FIG. 1.

In the thin-film magnetic head 1 having the overall structure described above, as shown in FIG. 2, the lower shielding layer 13 is provided in a state embedded in the underlayer 12. More specifically, the underlayer 12 has a recess 12a formed therein to define the lower shielding layer 13, and the lower shielding layer 13 is provided in the recess 12a. FIG. 2 is an enlarged partial sectional view of a multilayered structure around the lower shielding layer 13. The recess 12a is formed by ion milling in a position corresponding to a lower-shielding formed area, and it restricts the shape and the film thickness of the lower shielding layer 13 to be formed.

Defining the lower-shielding formed area (recess 12a) with utilization of the underlayer 12, as described above, provides a structure in which the underlayer 12 is present around the lower shielding layer 13 formed in the lower shielding formed area, and an upper surface 12b of the underlayer 12 and an upper surface 13a of the lower shielding layer 13 can constitute the same plane (flat plane). A step of additionally forming an alumina layer to make flat the surroundings of the lower shielding layer 13 is no longer required, and additional equipment for forming an alumina film is also no longer required. Accordingly, the equipment investment can be greatly cut down.

The lower shielding layer 13 is a layer formed, in accordance with the shape and the depth (length in the Z-direction) of the recess 12*a*, in an area substantially equal to the upper shielding layer 18 within a range not impairing the shielding function in the direction of the track width. More specifically, the lower shielding layer 13 can be formed such that its length in the direction of the track width is set larger than the length of the magnetoresistive sensor 2 in the same direction and substantially equal to the length of the upper shielding layer 18 in the same direction.

The lower shielding layer 13 also has the function of radiating heat generated from the magnetoresistive sensor 2. By forming, in the underlayer 12, the recess 12*a* for defining the lower shielding layer 13 like this embodiment, the film thickness of the underlayer 12 positioned just under the lower shielding layer 13 is reduced, and therefore thermal conductivity from the lower shielding layer 13 to the AlTiC substrate 11 is improved. Hence, even with the lower shielding layer 13 formed as a partial lower shielding layer, the heat generated from the magnetoresistive sensor 2 can be effectively radiated from the AlTiC substrate 11 through the lower shielding layer 13.

A method of forming the lower shielding layer 13 of the thin-film magnetic head 1, shown in FIGS. 1 and 2, will be described below with reference to FIGS. 3 to 6. Note that FIGS. 3 to 6 are partial sectional views, as viewed from the side of the head surface positioned to face the recording medium.

Figure 3:
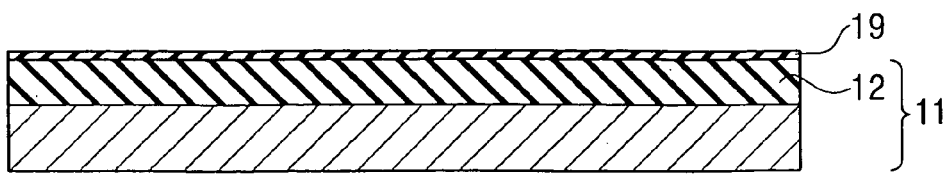
FIG. 3 is a sectional view showing one step of a method of forming the lower shielding layer shown in FIGS. 1 and 2.

First, as shown in FIG. 3, a $SiO_2$ film 19 is formed over an entire surface of the underlayer 12 present on the AlTiC substrate 11. The $SiO_2$ film 19 functions as a polishing stopper in a polishing step described later. The $SiO_2$ film 19 can be formed by sputtering or IBD (Ion Beam Deposition). The underlayer 12 present on the AlTiC substrate 11 used in this embodiment has a film thickness of about 2.0 μm, and the $SiO_2$ film 19 has a film thickness of about 0.4 μm, for example.

Figure 4:
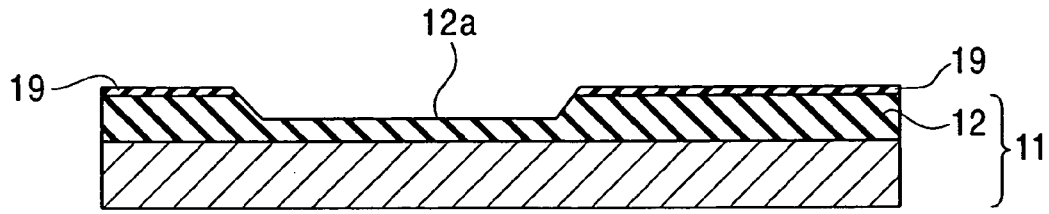
FIG. 4 is a sectional view showing a step carried out subsequent to the step shown in FIG. 3.

After forming the $SiO_2$ film 19, the lower-shielding formed area is patterned on an upper surface of the $SiO_2$ film 19 by photolithography. In a position corresponding to the patterned lower-shielding formed area, the recess 12*a* is formed through the $SiO_2$ film 19 and partly in the underlayer 12 (FIG. 4). Because the recess 12*a* restricts the shape and the film thickness of the lower shielding layer 13 to be formed, the recess 12*a* is preferably formed with high precision by ion milling. In this embodiment, the recess 12*a* restricts the length of the lower shielding layer in the direction of the track width to be larger than the length of the magnetoresistive sensor 2 in the same direction, which is formed above the lower shielding layer, and to be equal to the length of the upper shielding layer 18 in the same direction. The recess 12*a* has a depth of about 1.4 μm, for example.

Figure 5:
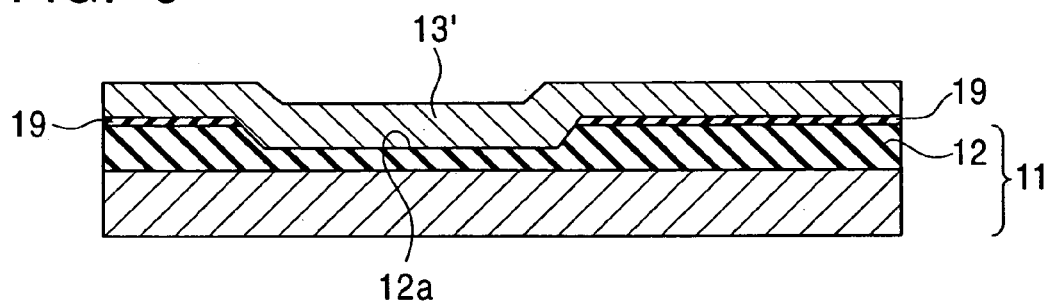
FIG. 5 is a sectional view showing a step carried out subsequent to the step shown in FIG. 4.

Subsequently, as shown in FIG. 5, a NiFe layer 13' serving as the lower shielding layer is formed on the entire surface (over the $SiO_2$ film 19 and the recess 12*a*) by plating. The NiFe layer 13' has a film thickness of about 2.0 μm.

Figure 6:
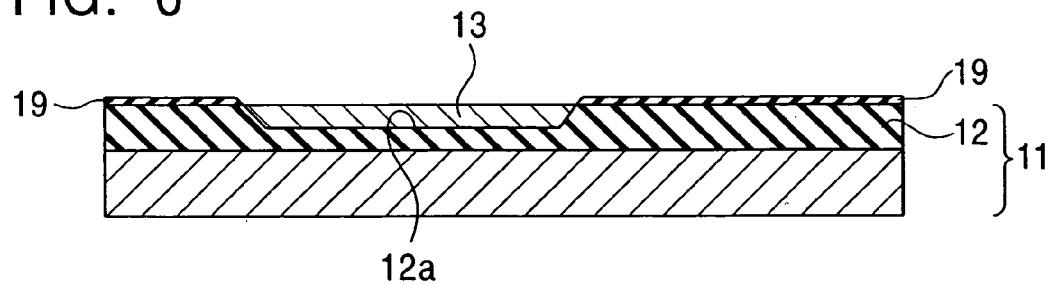
FIG. 6 is a sectional view showing a step carried out subsequent to the step shown in FIG. 5.

Then, the NiFe layer 13' is polished by CMP (Chemical Mechanical Polishing) until the $SiO_2$ film 19 is exposed, whereby the lower shielding layer 13 is formed as shown in FIG. 6. In this step, the $SiO_2$ film 19 functions as a stopper for the polishing. The $SiO_2$ film 19 has properties that it is highly endurable against an acid and alkali and has a polishing rate lower than that of the NiFe layer 13'. In the CMP step of this embodiment, a polishing rate ratio of the $SiO_2$ film 19 to the NiFe layer 13' is about 1:25. Because of such a difference in polishing rate, even when the polishing step with the CMP is continued after the $SiO_2$ film 19 has been exposed, the lower shielding layer 13 is hardly polished and the film thickness of the lower shielding layer 13 is kept at the same value as that immediately after the $SiO_2$ film 19 has been exposed. In other words, even if the timing of bringing the CMP into an end is shifted to some extent, the film thickness of the formed lower shielding layer 13 is not affected. Thus, by employing the $SiO_2$ film 19 as a stopper for the polishing, it is possible to properly and easily control the film thickness of the lower shielding layer 13.

After the end of the polishing step with the CMP, the $SiO_2$ film 19 on the underlayer 12 may be removed by RIE (Reactive Ion Etching) using $CF_4$, for example. Through the above-described steps, the lower shielding layer 13 shown in FIG. 2 is obtained. At this time, since the upper surface 13*a* of the lower shielding layer 13 and the upper surface 12*b* of the underlayer 12 constitute a flat plane, a step of forming an alumina layer to make flat the surroundings of the lower shielding layer 13 is no longer required. In the illustrated embodiment, the lower shielding layer 13 has a film thickness of about 1.0 to 1.3 μm.

After forming the lower shielding layer 13, other layers constituting the thin-film magnetic head, such as the lower gap layer and the magnetoresistive sensor, are successively formed on the lower shielding layer 13 in the predetermined order according to the usual manner, whereby the thin-film magnetic head 1 shown in FIG. 1 is obtained. Incidentally, removing the $SiO_2$ film 19 on the underlayer 12 is not essential and the subsequent steps may be continued without removing the $SiO_2$ film 19.

Figure 7:
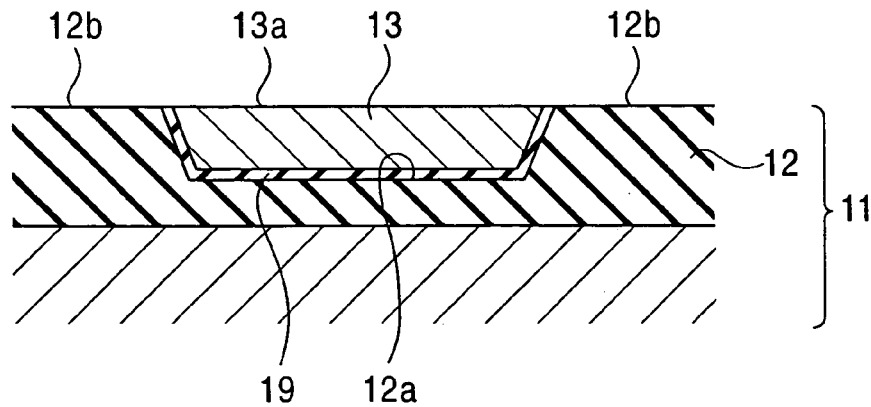
FIG. 7 is an enlarged partial sectional view of a multilayered structure around a lower shielding layer of a thin-film magnetic head according to a second embodiment of the present invention.

FIG. 7 is an enlarged partial sectional view, as viewed from the side of a head surface positioned to face a recording medium, of a multilayered structure around a lower shielding layer of a thin-film magnetic head according to a second embodiment of the present invention. This second embodiment differs from the first embodiment in that, to increase insulation between the lower shielding layer 13 and the AlTiC substrate 11, a $SiO_2$ film 19 having a higher dielectric voltage withstand than alumina constituting the underlayer 12 is interposed between the underlayer 12 and the lower shielding layer 13. In FIG. 7, constituent elements having the same functions as those in the first embodiment are denoted by the same reference symbols as those in FIGS. 1 and 2. As with the first embodiment, though not shown in FIG. 7, other layers constituting the thin-film magnetic head, such as a lower gap layer and a magnetoresistive sensor, are successively formed on the lower shielding layer 13 in the predetermined order.

FIGS. 8 to 11 are partial sectional views, as viewed from the side of the head surface positioned to face the recording medium, showing successive steps of a method of forming the lower shielding layer 13 shown in FIG. 7. This illustrated embodiment employs an AlTiC substrate 11 having an underlayer 12 with a film thickness of about 2.0 μm, for example.

Figure 8:
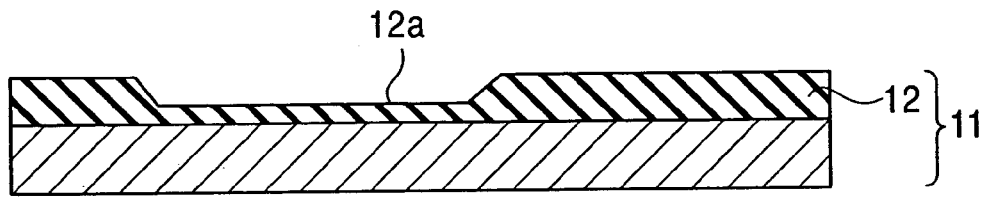
FIG. 8 is a sectional view showing one step of a method of forming the lower shielding layer shown in FIG. 7.

First, a lower-shielding formed area is patterned on an upper surface of the underlayer 12 on the AlTiC substrate 11 by photolithography. At a position corresponding to the patterned lower-shielding formed area, a recess 12*a* having a depth of about 1.0 μm, for example, is formed in the underlayer 12 (FIG. 8). The recess 12*a* is preferably formed by ion milling. The recess 12*a* can be formed, for example, so as to restrict the length of the lower shielding layer in the direction of the track width to be larger than the length of the magnetoresistive sensor 2 in the same direction, which is formed above the lower shielding layer, and to be substantially equal to the length of the upper shielding layer 18 in the same direction.

Figure 9:
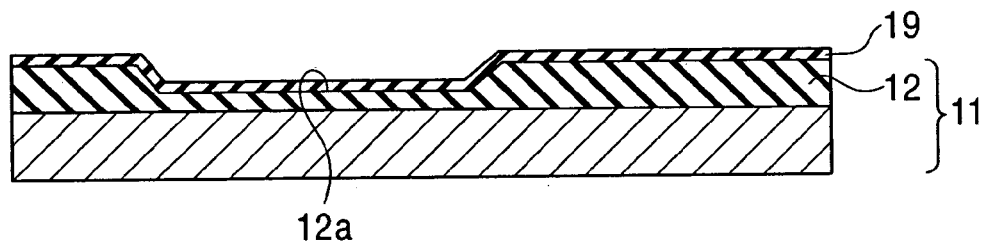
FIG. 9 is a sectional view showing a step carried out subsequent to the step shown in FIG. 8.
Figure 10:
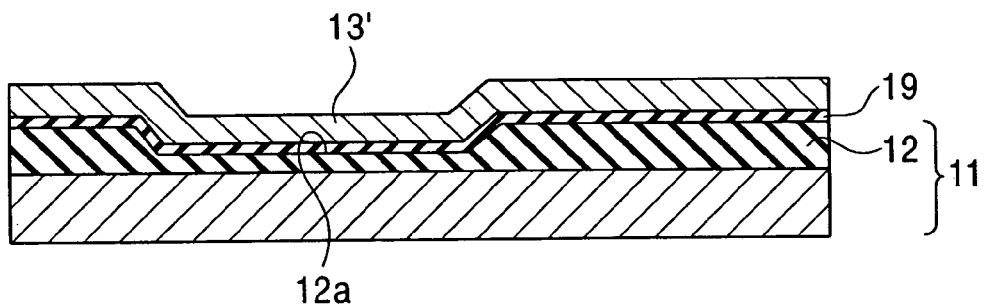
FIG. 10 is a sectional view showing a step carried out subsequent to the step shown in FIG. 9.

Then, a $SiO_2$ film 19 is formed over an entire surface of the underlayer 12 including the recess 12a (FIG. 9). The $SiO_2$ film 19 is formed in thickness of 0.4 µm, for example, by sputtering or IBD. Subsequently, as shown in FIG. 10, a NiFe layer 13' serving as the lower shielding layer is formed on an entire surface of the $SiO_2$ film 19 by plating. The NiFe layer 13' has a film thickness of about 2.0 µm.

Figure 11:
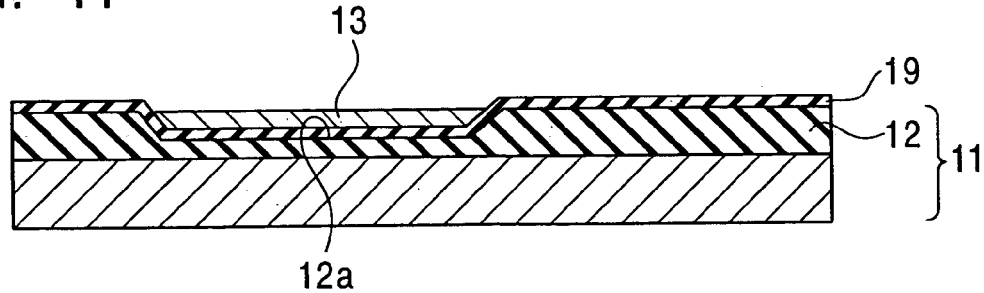
FIG. 11 is a sectional view showing a step carried out subsequent to the step shown in FIG. 10.

Then, the NiFe layer 13' is polished by CMP (Chemical Mechanical. Polishing) until the $SiO_2$ film 19 positioned around the recess 12a is exposed, whereby the lower shielding layer 13 is formed as shown in FIG. 11. In this CMP step, the $SiO_2$ film 19 positioned around the recess 12a functions as a stopper for the polishing. More specifically, because of a difference in polishing rate between the $SiO_2$ film 19 and the NiFe layer 13', even when the polishing step with the CMP is continued after the $SiO_2$ film 19 has been exposed, the NiFe layer 13' is hardly polished. Thus, it is possible to properly and easily control the film thickness of the lower shielding layer 13.

After the end of the polishing step with the CMP, the $SiO_2$ film 19 positioned around the recess 12a may be removed by Reactive Ion Etching, (RIE), using $CF_4$. Through the above-described steps, the lower shielding layer 13 shown in FIG. 7 is obtained. At this time, since an upper surface 13a of the lower shielding layer 13 and an upper surface 12b of the underlayer 12 constitute a flat plane, a step of forming an alumina layer to make flat the surroundings of the lower shielding layer 13 is no longer required. Assuming, as described above, that the depth of the recess 12a is about 1.0 µm and the film thickness of the $SiO_2$ film 19 is about 0.4 µm, the total thickness of the lower shielding layer 13 and the $SiO_2$ film 19 is about 1.1 to 1.3 µm.

Although the $SiO_2$ film 19 positioned around the recess 12a is removed as described above, the $SiO_2$ film 19 still remains in the recess 12a between the lower shielding layer 13 and the underlayer 12 even after the end of the polishing step with the CMP. The presence of the $SiO_2$ film 19 between them increases insulation between the lower shielding layer 13 and the AlTiC substrate 11, and hence makes it possible to effectively prevent electrostatic breakdown even with the lower shielding layer 13 formed as a partial lower shielding layer.

After forming the lower shielding layer 13, other layers constituting the thin-film magnetic head, such as the lower gap layer and the magnetoresistive sensor, are successively formed on the lower shielding layer 13 in the predetermined order according to the usual manner, whereby the thin-film magnetic head similar to that shown in FIG. 1 is obtained. Incidentally, removing the $SiO_2$ film 19 positioned around the recess 12a is not essential and the subsequent steps may be continued without removing the $SiO_2$ film 19.

While the thin-film magnetic head 1 according to each of the above-described embodiments is a thin-film magnetic head for reproduction, a thin-film magnetic head for recording and reproduction is generally constructed by forming a thin-film inductive head for recording (magnetoresistive recording head) above the thin-film magnetic head 1 (in the Z-direction). Roughly speaking, a thin-film magnetic head for recording and reproduction is constructed by successively forming the lower shielding layer 13, the lower gap layer 14, the magnetoresistive sensor 2, the upper gap layer 17 and the upper shielding layer 18, then forming a lower core layer on the upper shielding layer 18 (in the case of a piggyback type structure) (or, as an alternative, a merged type structure is obtained in which the upper shielding layer serves also as the lower core layer), and then by successively forming, on the lower core layer, a magnetic pole section and a coil layer both positioned to locate in an ABS (Air Bearing Surface), an upper core layer, and a barrier layer. The present invention is also of course applicable to such a thin-film magnetic head for recording and reproduction.

To prevent any thin-film head expansion or distortion, a substantial amount of heat generated by the coil layer of the recording head needs to be dissipated. Thin-film magnetic head expansion or distortion due to heat tend to cause the thin-film magnetic head to project out of the ABS surface and then damage (or erase) the recording medium (or magnetic information recorded on the recording medium). Whereas, within the current embodiments, since the film thickness of the underlayer positioned just under the lower shielding layer is reduced, the thermal conductivity from the lower shielding layer to the AlTiC substrate is therefore improved and the heat generated from the magnetoresistive sensor and the coil layer can be effectively dissipated from the AlTiC substrate through the lower shielding layer. As a result, potential troubles caused by the heat generated from the magnetoresistive sensor and the coil layer can be effectively prevented.

According to the present invention, the recess for defining the lower shielding layer is formed in the underlayer present on the AlTiC substrate, and the lower shielding layer is formed in the recess. Hence, a step of forming an alumina layer to make flat the upper surface of the lower shielding layer including the surroundings thereof is no longer required, and the equipment investment can be greatly cut down. Further, since the underlayer has a reduced film thickness in its area corresponding to the recess, the heat generated from the magnetoresistive sensor and the coil layer can be effectively dissipated and potential troubles caused by the generated heat can be effectively prevented.

Also, according to the present invention, the $SiO_2$ film is employed as a stopper in the step of polishing the lower shielding layer. Because of a difference in the polishing rates between the $SiO_2$ film and the soft magnetic material constituting the lower shielding layer, the film thickness of the lower shielding layer can be precisely and easily controlled. In addition, according to the present invention, since the $SiO_2$ film is present between the underlayer and the lower shielding layer, insulation between the AlTiC substrate and the lower shielding layer can be improved.

What is claimed is:

1. A method of forming a thin-film magnetic head, the method comprising the steps of:
    preparing an AlTiC substrate having an underlayer and forming a $SiO_2$ film on said underlayer;
    forming, through said $SiO_2$ film and partly in said underlayer, a lower-shielding formed recess corresponding to an area in which a lower shielding layer is to be formed;
    forming a lower shielding layer made of a soft magnetic material on a substrate surface including said lower-shielding formed recess; and
    polishing said lower shielding layer with said $SiO_2$ film serving as a stopper until said $SiO_2$ film is exposed.

2. A method of forming a thin-film magnetic head according to claim 1, wherein said underlayer is made of alumina.

3. A method of forming a thin-film magnetic head according to claim 1, further comprising a step of removing said $SiO_2$ film after the step of polishing said lower shielding layer.

* * * * *